J. PICKETTS.
RESILIENT WHEEL.
APPLICATION FILED DEC. 22, 1914.
1,271,358.
Patented July 2, 1918.
2 SHEETS—SHEET 1.
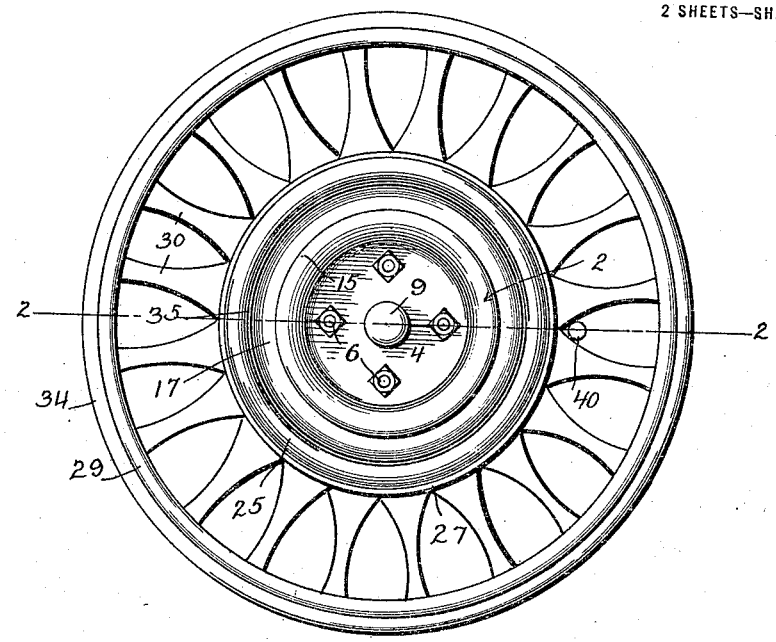
Fig. 1.
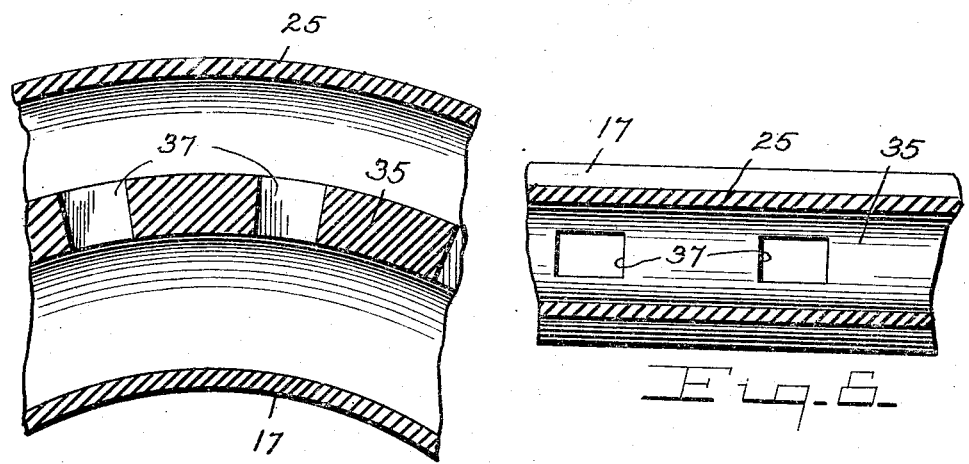
Fig. 5.
Fig. 6.
Witnesses
Inventor
J. Picketts.
By
Attorney

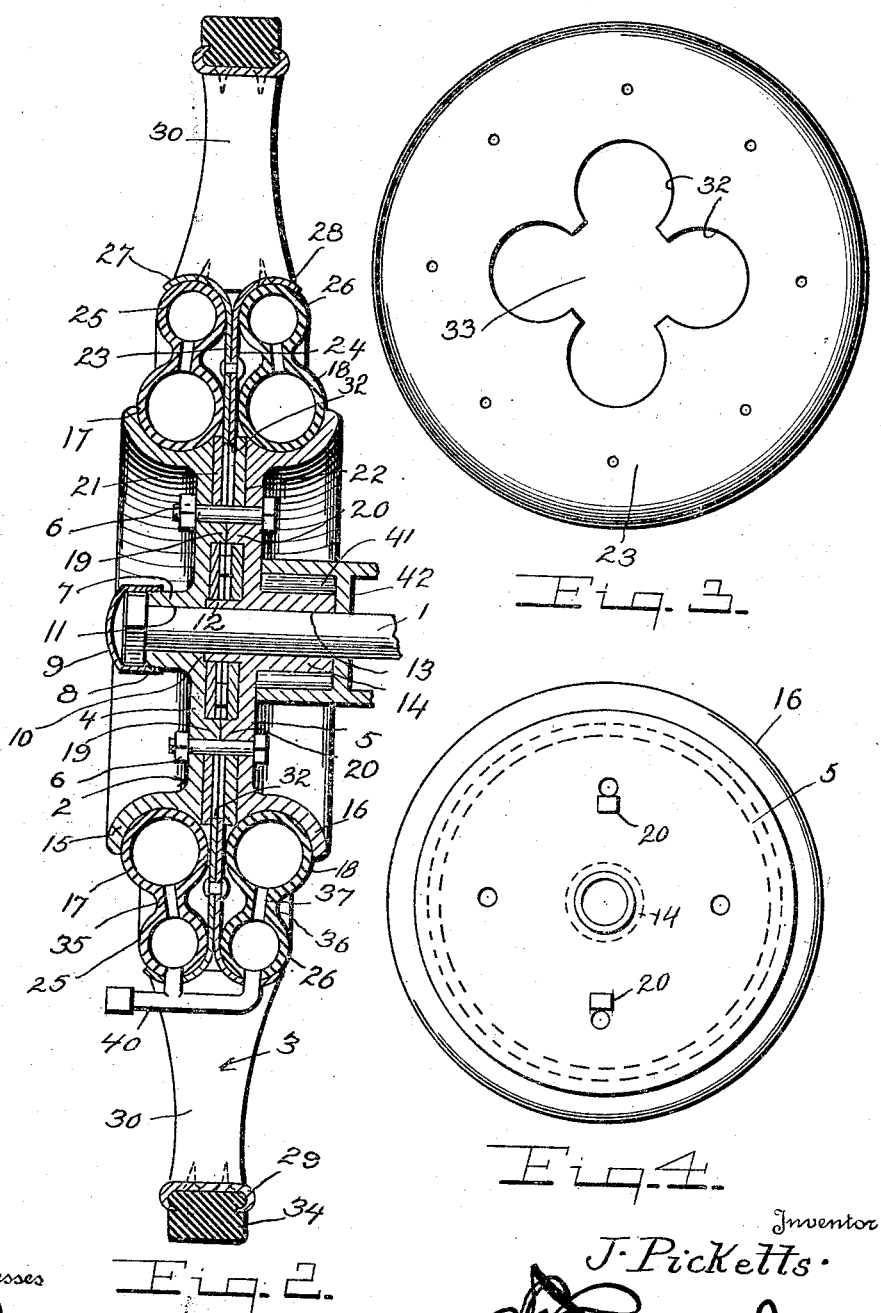

UNITED STATES PATENT OFFICE.

JAMES PICKETTS, OF SAN DIEGO, CALIFORNIA.

RESILIENT WHEEL.

1,271,358.

Specification of Letters Patent. Patented July 2, 1918.

Application filed December 22, 1914. Serial No. 878,591.

*To all whom it may concern:*

Be it known that I, JAMES PICKETTS, a British subject, residing at San Diego, in the county of San Diego and State of California, have invented certain new and useful Improvements in Resilient Wheels; and I do hereby declare the following to be a full, clear, and exact description of the invention, such as will enable others skilled in the art to which it appertains to make and use the same.

This invention relates to resilient wheels for automobiles or like vehicles and the primary object of the invention is the provision of a resilient wheel which has a plurality of pneumatic cushioning tires mounted about the periphery of the hub of the wheel and connected to the wheel rim or felly and tread tire by means of suitable spokes for eliminating the liability of puncturing or rupturing the pneumatic tire during the rotation of the wheel.

Another object of this invention is to mount about the periphery of the hub of the wheel a plurality, chiefly four penumatic tubes which are disposed in pairs upon opposite sides of a central dividing plate, and to connect all of these tubes with a single inlet air valve for maintaining a uniform air pressure within the tube.

A still further object of this invention is to provide a hub structure which is formed of two side plates having their facing sides spaced from each other to permit the sliding movement therebetween of plates for supporting the outermost of said pneumatic or inflatable tube so as to permit of the compensating movement of the tire supporting members to the disfiguration of the tube.

With the foregoing and other objects in view this invention consists in such novel features of construction, combination and arrangement of parts as will be hereinafter more fully described illustrated in the accompanying drawings and claimed.

In describing the invention in detail reference will be had to the accompanying drawings wherein like characters designate like or corresponding parts throughout the several views, and in which:—

Figure 1 is a side elevation of a wheel constructed in accordance with this invention.

Fig. 2 is a sectional view on the line 2—2 of Fig. 1.

Fig. 3 is a side elevation of one of the tire supporting plates.

Fig. 4 is a detail side elevation of one of the hub plates.

Fig. 5 is a vertical section through a set or pair of inflatable cushioning tires, and Fig. 6 is a cross section through one of the inflatable cushioning tires.

Referring more particularly to the drawings, 1 designates the spindle of an ordinary vehicle axle, which has mounted for rotation thereupon the hub structure 2 of a wheel 3. The hub structure 2 is composed substantially of two plates 4 and 5, which form practically inner and outer plates, the plate 4 being positioned in the outer side of the wheel structure while the plate 5 is positioned on the inner side. The two plates 4 and 5 are securely connected to each other and held against independent movement by bolts 6. The plate 4 has a projecting hub portion 7 formed thereupon which is externally screw threaded as is shown at 8 for receiving a dust cap 9 for preventing dust from entering the hub portion 4 and from the spindle 1. The plate 4 is further provided with an outwardly extending recess 10 which runs around and communicates with a bore 11 of the hub section 7 of the plate 4. The recess 10 receives therein the head of the projecting flange 12 which is formed upon the face of the plate 5 and extends about the bore 13 of the hub section 14 of the plate 5.

The plates 4 and 5 have transversely extending arcuate flanges 15 and 16 formed upon their outer marginal edges, which flanges are provided for supporting and retaining pneumatic or inflatable tubes 17 and 18.

The plates 4 and 5 further have lugs 19 and 20 formed upon their facing sides, which lugs engage each other and hold the plates in spaced relation to each other as is clearly shown in Fig. 2 of the drawings.

The facing sides of the plate 4 and 5 have fiber disks 21 and 22 secured thereto, against the inner facing sides of which disks the outer sides of the disks 23 and 24 engage upon movement of the disks 23 and 24.

The disks 23 and 24 have their outer edges rolled or curved to conform to the shape of the inflatable tubes 25 and 26, when these tubes are inflated as is shown at 27 and 28. The plates 23 and 24 have their facing sides lying in abutting engagement with each other and they are securely attached one plate to the other by means of rivets or suitable fastening means so that the two plates or disks will move in unison with each other upon inward pressure thereon, thereby permitting of the exercising of the cushioning proclivities of the inflatable tubes 25 and 26. The curved edges 27 and 28 of the disks 23 and 24 are secured to the wheel rim 29 by means of spokes 30, which spokes may be constructed of wood, as is shown in the drawings, or they may be the ordinary type of wire spokes, such as is employed at times in the construction of vehicle wheels.

The disk plates 23 and 24 are provided with a plurality of substantially circular openings 32 formed therein, which communicate with the substantially rectangular opening 33 formed in the center, through which rectangular openings the projecting sleeve 12 extends and the spindle 1.

The rim 29 may have any suitable type of tire 34 mounted thereon, but a resilient solid rubber tire is preferred, as is shown in the drawings.

The inflatable tubes 17 and 25 are connected to each other by a web 35, and the tubes 18 and 26 are connected by a web 36 which webs are provided with a plurality of openings about their circumference and extending therethrough, providing for communication between the interior of the respective inflatable tubes clearly shown at 37 in Figs. 5 and 6 of the drawings.

In referring to the inflatable tubes 17, 18, 25 and 26, the tubes 17 and 25 will be hereafter designated as the outer set of inflatable tubes, in that they are positioned upon the outer face or side of the wheel, while the tubes 18 and 26 will be referred to as the inner set of tubes, owing to the fact that they are positioned upon the inner side or face of the wheel, or the one which is next to the vehicle body (not shown). The tubes 25 and 26 are of smaller diameter than the tubes 17 and 18 and they are positioned nearer to the rim 29 of the wheel than are the tubes 17 and 18, the latter tubes being supported directly by the transversely extending arcuate flanges 15 and 16 which are formed upon the plates 4 and 5. The tubes 25 and 26 have a valve 40 connected thereto, which valve is provided for inflating the tubes 25 and 26 simultaneously. Owing to the various communications between the tubes 17 and 25 and 18 and 26 through the openings 37, the tubes 17 and 18 will be inflated simultaneously with the inflation of the tubes 25 and 26 and furthermore during the travel or use of the wheel, the air pressure within the tubes will be maintained at a uniform pressure equalizing the cushioning proclivities of all of the inflatable tubes and causing them to act in unison in absorbing shock occasioned by the rotation of the wheel. The plates 23 and 24 being slidably seated between the fiber disks 21 and 22 will move inwardly upon the engagement with the tread tire 34 with an obstruction so as to permit of the positive action of the cushioning of the various inflatable tubes.

The hub 14 has roller bearings 41 engaging the outer surface thereof and the inner surface of the axle casing bearings 42 for decreasing the friction of rotation of these parts.

From the foregoing description taken in connection with the accompanying drawings the advantages of construction and of the method of operation of the improved resilient wheel will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A wheel comprising inner and outer plates, hub portions formed on said plates and adapted to receive an axle, abutting lugs formed on the opposing faces of said plates to hold the plates in spaced relation, said outer plate having an annular recess in its inner face and in communication with the bore of the hub portions, an annular extension formed on the inner face of the inner plate and received within the recess to form a continuous hub to said plates, relatively spaced fiber disks disposed between said plates, means securing the plates against relative movement, flanges formed on said plates, pneumatic tubes carried by said flanges, a second pair of disks disposed between the first pair of disks, and having circular openings and central openings in communication with the circular openings and which receive the lugs and hub portions to limit the outward movement of said plates, and permit of relative movement thereof in relation to the first named disks, flanges formed on the second pair of disks and overlying the tubes, spokes secured to the second flanges, and a rim carried by the spokes.

In testimony whereof I affix my signature in presence of two witnesses.

JAMES PICKETTS.

Witnesses:
E. G. SMITH,
L. FREDERICK.